United States Patent [19]

Iijima

[11] 4,100,554
[45] Jul. 11, 1978

[54] CAMERA
[75] Inventor: Yaichi Iijima, Hachioji, Japan
[73] Assignee: Konishiroku Photo Industry Co., Ltd., Tokyo, Japan
[21] Appl. No.: 602,916
[22] Filed: Aug. 7, 1975
[30] Foreign Application Priority Data
Aug. 13, 1974 [JP] Japan .................................. 49-97026
[51] Int. Cl.² ............................................ G03B 15/05
[52] U.S. Cl. .................................... 354/145; 354/196
[58] Field of Search ............... 354/141, 148, 145, 126, 354/187, 196, 149; 240/1.3
[56] References Cited
U.S. PATENT DOCUMENTS

| | | | |
|---|---|---|---|
| 3,169,464 | 2/1965 | Köppen | 354/196 |
| 3,260,181 | 7/1966 | Hennig et al. | 354/149 |
| 3,286,611 | 11/1966 | Lange | 240/1.3 X |
| 3,374,719 | 3/1968 | Horton et al. | 354/126 |
| 3,620,151 | 11/1971 | Kitai | 354/196 |
| 3,852,790 | 12/1974 | Robinson | 354/126 X |
| 3,882,514 | 5/1975 | Graham | 240/1.3 X |

Primary Examiner—Edna M. O'Connor
Attorney, Agent, or Firm—Bierman & Bierman

[57] ABSTRACT

A camera having a flash mounted thereon is provided wherein the flash is moveable with respect to the optical axis of the camera to avoid red eye. When flash must be used, the flash may be raised and one or more pins are provided to automatically disengage the aperture control mechanism from an automatic exposure meter system and engage it with the focusing ring of the camera to automatically adjust aperture as a function of lens to object distance.

3 Claims, 5 Drawing Figures

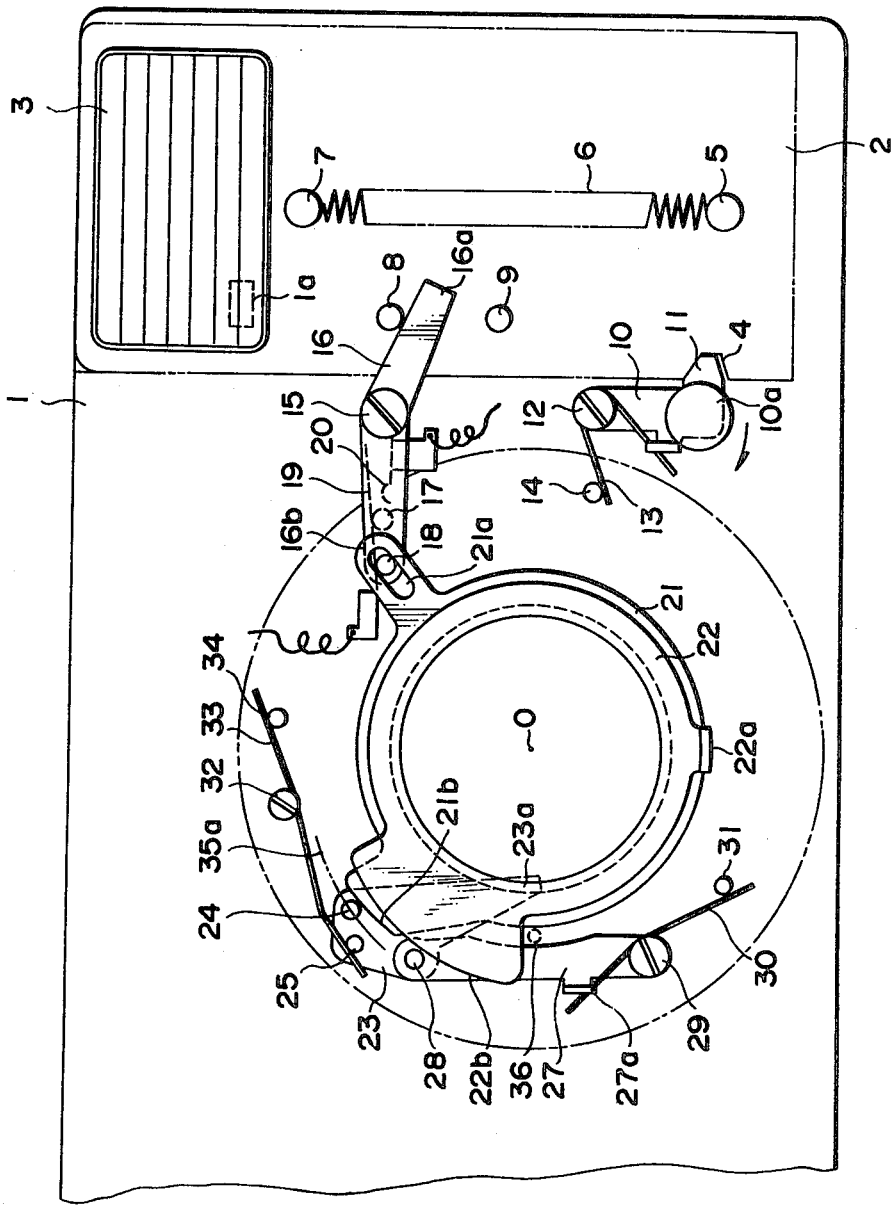

CAMERA

This invention relates to a camera equipped with an electronic flash device. Many types of cameras equipped with a electronic flash device are marketed. Moreover, such a camera is desired to be small. When a camera equipped with the electronic flash device is made small however, an undesirable phenomenon occurs. This phenomenon will be explained hereinbelow. WHen a camera is compacted, the light emitting portion of the electronic flash device is positioned close to the optical axis of photographing objective. In this case, there may be induced a phenomenon resulting in the pupils of the eyes of the photographed person coming out red-tinted when the subject person is photographed by using a flash. Such phenomenon, which is generally called a "red eye" phenomenon, is considered attributable to the incidence into the photographing objective of the red light reflected from the retina (assuming the natural red color) in the eyeball illuminated by the flash light. More specifically, the red-eye phenomenon is related to the distance between the emission center of a flash device and the optical axis of the objective lens. The distance which can prevent the red eye phenomenon is dependent on photographing distance and the difference of eyeball configuration between persons. But, since photographing with use of flash light is generally conducted with photographing distance of at most 7 meters and no great difference of eyeball configuration exists between persons, the red eye phenomenon is effectively prevented by providing the distance of at least 60 mm between the emission center of the flash lamp and the optical axis of the photographing objective. Although the red eye phenomenon is not completely prevented by the above mentioned distance, the above mentioned distance is satisfactory for preventing the phenomenon for practical purposes.

An object of this invention is to provide a compact camera equipped with an electronic flash device, which camera is free from the red-eye phenomenon. The novel feature of this camera resides in that the built-in electronic flash device is arranged such that its light emitting portion can be pulled out from or pushed down into the camera body and the operation of pulling out said light emitting portion cooperates with a switch for closing the electronic light emission circuit.

In this case, when said light emitting portion is pulled up to its extruded (operative) position, the distance from the center of said light emitting portion to the optical axis of the photographing objective becomes greater than that when the light emitting portion is in its down or inoperative position.

Another object of this invention is to provide a compact camera equipped with the mentioned electronic flash device, an automatic exposure controlling device and diaphragm means for cooperating with a focusing ring to provide a correct value of the aperture for flash photography when the light emitting portion is pulled out.

Now the present invention is described by way of an embodiment thereof while having reference to the accompanying drawings.

FIG. 3 is a detail view of the operating mechanism of the camera when set for daylight photography;

Figure 1:
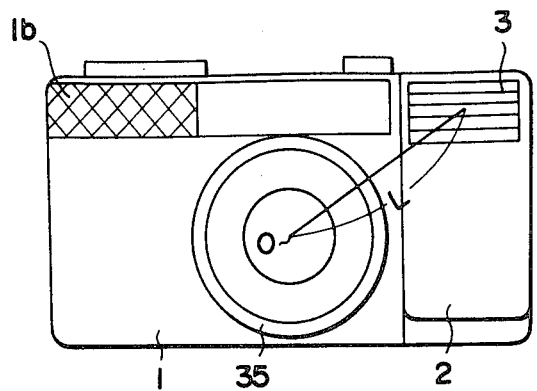
FIG. 1 is a front view of a camera employing a flash and showing the flash in its inoperative location.
Figure 4:
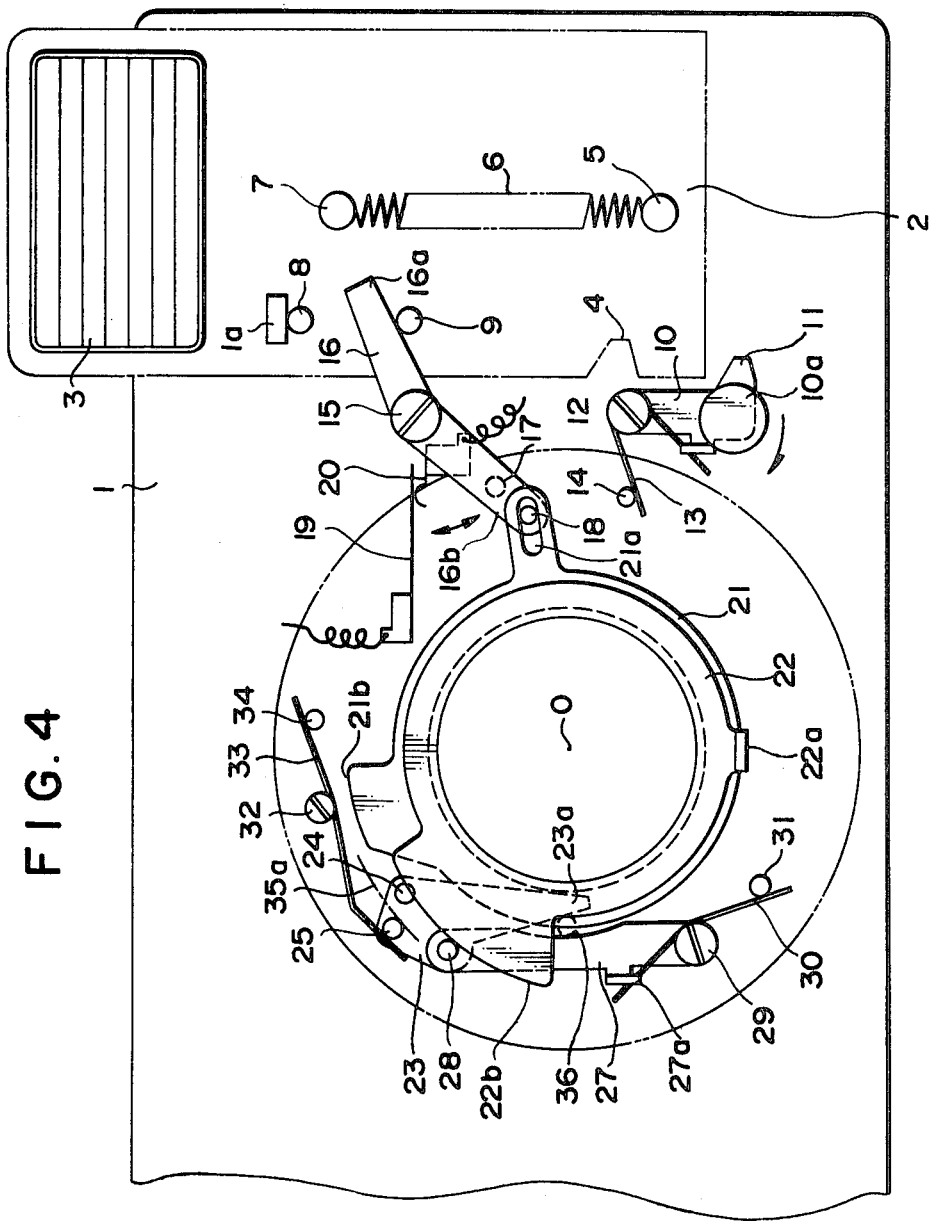
FIG. 4 is a detail view of the operating mechanism of the camera when set for flash photography.

Referring generally to the drawings, reference numeral 1 designates the camera body, 1a a stopper block formed in said camera body 1 for restricting projection of the electronic flash box 2 which is to be described later, and 1b is an light receiving section for supplying photoelectric information of the brightness of the object to the exposure meter in the automatic exposure adjuster or controlling device (not shown), which is known per se and contained in the camera body 1. The electronic flash box 2 is arranged as projectable from or retractable into the camera body 1 and houses therein all or part of the electronic flash lighting device which is known per se. For daylight photographing, it is placed in its retracted position in the camera body 1 as shown in FIGS. 1 and 3, but when for flashlight photographing, it is pulled out to its projected position above the top surface of the camera body as shown in FIGS. 2 and 4.

Figure 2:
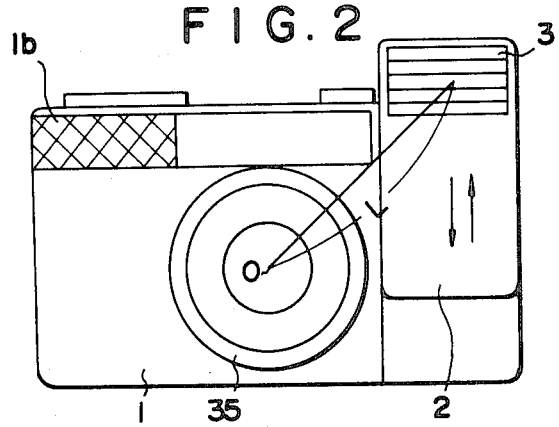
FIG. 2 is a front view of the camera of FIG. 1 showing the flash in its operative location.

The amount of projection of the flash box 2 is set such that when said box is pulled out to its projected position for a distance L between the flash light emitting portion 3 and the optical axis of photographing O will be properly spaced as shown in FIG. 2 to avoid occurence of the aforementioned "red eye" phenomenon, for example 67 mm, and when said box 2 is in its retracted position, they will be spaced at a distance L, (FIG. 1) for example 55 mm, selected to attain the maximum compactness of the camera body without regard to said "red eye" phenomenon. Numeral 3 designates the flash light emitting portion provided in said flash box 2, 4 is a notch provided at a lower side of said box 2, 5 is a pin mounted on said box, and 6 a tension spring stretched between said pin 5 and another pin 7 planted on the camera body. Stop pins 8 and 9 also are mounted on said box 2, and a switchover member 10 is pivotally secured to the camera body 1 by a shaft 12. The head 10a of said member 10 is exposed to the outside of the camera body.

A protuberance 11 is formed on said switchover member and designed to engage in said notch 4 formed in the flash box 2. A spring 13 is adapted to urge said switchover member counterclockwise, 14 being a spring stop. An intermediate lever 16 is pivoted on a shaft 15, one end of said intermediate lever 16 extending between the pins 8 and 9 while the other end 16b has mounted thereon a coupling pin 18. A switch-drivng pin 17 is mounted on the rear of the central part of the left arm of said intermediate lever 16. Pin 17 is so positioned that when the intermediate lever 16 is at the position shown in FIG. 3 (that is, when the flash light box 2 is at its retracted position), it opens the switch 19, 20 between the battery and condenser (not shown) of the flash light circuit which is known per se, and when said lever 16 is at the position shown in FIG. 4 (that is, when the flash light box 2 is at its projected position), said pin 17 closes said switch 19, 20. In a known manner when the switch 19, 20 is closed, the condenser is charged by the battery or cell.

In case of CdS cell is used for the light receiving section of the automatic exposure adjuster, necessitating special power source, in such event a switch for opening and closing the power source circuit may be provided in addition to said switch 19, 20 or a double throw switch may be used instead of the illustrated switch 19, 20 so as to selectively open or close the power source circuit of both the automatic exposure adjuster and the flash light emission circuit.

A flashlight photography changeover ring 21 is rotatably mounted around the optical axis 0. It has projecting from its periphery an arm having a radially elongated slot 21a for receiving the said coupling pin 18, and a changeover cam 21b. Coaxially positioned on top of the said ring 21 is a guide number ring 22 also rotatably mounted about the optical axis 0 and provided with an operating extension 22a positioned outside of the camera body (or outside of the lens tube) and a projecting compensation cam 22b. The cam 22b is designed to act upon diaphram driving plate 23 (in a manner hereinafter more fully explained) to compensate for the difference in sensitivity between films to be used with respect to a correlation of the photographing distance and the diaphragm aperture in the predetermined guide member. Plate 23 is pivoted on shaft 28 mounted on the free end of the rocker lever 27 which is to be described later. When the changeover ring 21 is turned from the position shown in FIG. 3 to the position shown in FIG. 4, the end 23a of driving plate 23 contacts pin 36 mounted on the diaphragm blade 23 as described later. A first pin 24 is mounted on diaphragm driving plate 23 such that it is engageable with the changeover cam 21b on the flashlight photography changeover ring 21 only when said ring 21 remains at its daylight photographing position shown in FIG. 3; i.e., this first pin 24 is of such a height that it is engageable with said changeover cam 21b, but not engageable with the guide number ring 22 thereabove. A a second pin 25 is mounted on the diaphragm driving plate 23 so as to be engageable with a cam 35a formed on a focusing ring 35, which is to be described later, only when said changeover cam 21b is located at the flashlight photographing position shown in FIG. 4.

The rocker lever 27 is pivoted on a shaft 29, and supports movable shaft 28 as previously described. This movable shaft 28 is designed to pivotally support the diaphragm drive plate 23 on one hand and to normally engage with the compensating cam 22b of said guide number ring 22 on the other hand. A spring normally urges rocker plate 27 in a clockwise direct through abutment 27a, with one end of said spring pressing against by a pin 31. A spring 33 is held in position by a central abutment 32 and an end pin 34 and is adapted to turn the diaphragm driving plate 23 clockwise relative to the movable shaft 28 through said second pin 25. 36 is an aperture pin in the diaphragm assembly provided in the taking lens tube. This aperture pin is arranged such that, on one hand, it is driven by a pointer detector member of the automatic exposure adjuster (not shown and known per se) to automatically set the proper diaphragm aperture in the known manner, and on the other hand (that is, when flashligh photographing is made), it sets the diaphragm aperture through said diaphragm driving plate 23 by the operation of a cam (focus aperture control cam 35a in the case of the present invention) which operates when focusing.

Figure 5:
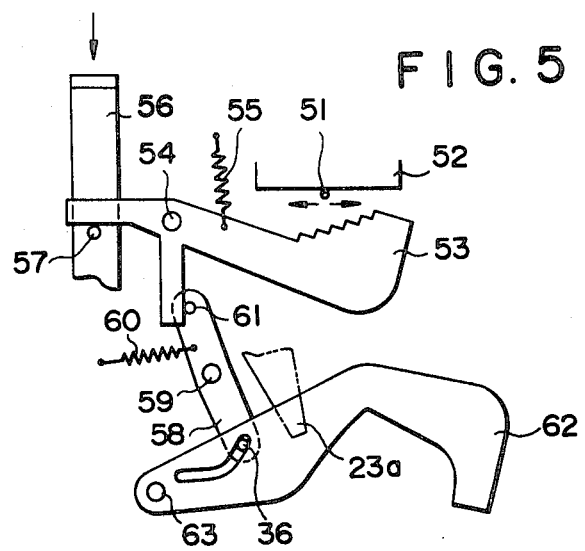
FIG. 5 is a schematic of the structural elements for operating the diaphragm of the camera in both daylight and flash photography modes.

FIG. 5 schematically shows an example of the automatic aperture control mechanism. In this figure, numeral 23a indicates an end of said diaphragm driving plate, 36 is an aperture pin, 51 a meter pointer for automatic exposure adjustment, 52 a pointer abutment, and 53 a pointer detecting member having a teethed portion and swingably pivoted on shaft 54. It is adapted to hold and fix said meter pointer 51 between it and said pointer abutment 52 when the pointer detecting member 53 is moved counterclockwise under the action of spring 55. 56 a shutter release plate operatively coupled to said toothed member 53 through a pin 57 on said plate, 58 is a diaphragm driving lever pivotally supported by is a shaft 59 and urged counterclockwise by a relatively weak spring 60. 61 is a transmission pin, and 62 an aperture blade pivoted on shaft 63.

The meter pointer 51 is set such that it deflects to the left in the drawing (in the direction of minimizing the aperture when the field brightness is high while it displaces to the right (in the direction of full opening the diaphragm blades) when the field is too dark to take a photograph without using a flash light.

Let us here briefly describe the operation of this mechanism. If the field is bright, the meter pointer 51 deflects to the left, so that if the release plate 56 is pushded down under this condition, the detecting member 53 is forced to swing counterclockwise by the spring 55, pressing pointer 51 against the abutment 52 at the step of the serration corresponding to the brightness of the subject. Consequently, the diaphragm driving lever 58 is also accordingly turned to correspondingly reduce the aperture provided by the blades 62 through the pin 36.

When the field is dark, the meter pointer 51 deflects to the right, so that in the case of flashlight photography, the aperture pin 36 is displaced in the aperture reducing direction by the end 23a of the diaphragm driving plate 23 which is moved by the action of the focus — aperture control cam 35a, and as a result, the aperture blades 62 provide an aperture corresponding to the photographing distance at that time.

The above-said operations are further described concerning the respective cases. (When the field is sufficiently bright)

In this case, there is no need of using the flash light, so that photograph taking is performed by the normal photographing operations with the flash box 2 kept in its retracted position in the camera body 1. When the camera is directed to the subject, the automatic exposure adjuster operates to deflect the meter pointer 51 to a predetermined position corresponding to the field brightness, so that if the shutter release plate 56 is pushed down under this condition, the toothed member 53 swings a predetermined amount to move the aperture blades 62 by an amount corresponding to the angle of swing of said member 53 to provide a proper diaphragm aperture, and after this, the shutter is released.

In this case, since the intermediate lever 16, flashlight photography changeover ring 21 and diaphragm driving plate 23 stay in the positions shown in FIG. 3, the aperture pin 36 can move freely independently of these members. Also, as the flash light emission circuit operating switch 19, 20 stays open as shown in the drawing (FIG. 3) even if the flashlight synchronizing contacts (not shown) in the shutter assembly are closed with shutter release, no light is emitted from the flash light lamp (When the field is dark).

In the ordinary cameras having a built-in automatic exposure adjuster, various types of warning are given when the field is so dark that the automatic exposure can not operate. Therefore, if such warning is given, the flash box 2 is pulled up above the camera body by turning the head 10a of the switchover member clockwise.

That is, when the head 10a of the switchover member is turned clockwise about the shaft 12, the protuberance 11 of said head is disengaged from the notch 4 in the flash box 2 so that the flash box 2 is projected upwardly of the camera body 1 by the force of the tension spring 6 as shown in FIG. 4. At this time, the pin 9 provided on the flash light box turns the intermediate lever 16 counterclockwise. Consequently the flashlight photographing changeover ring 21 is turned clockwise about the optical axis 0 through the coupling pin 18 in the elongated slot 21a to disengage of the changeover cam 21b from first pin 24. Whereupon the diaphragm driving plate 23 is turned by the spring 33 until the second pin 25 mounted on said driving plate contacts the focus — aperture control cam 35a on the focusing ring.

Therefore it becomes swingable around the movable shaft 28 by the cam action of the focus-aperture control cam 35a when the focusing ring 35 is operated. Accordingly, the aperture pin 36 becomes movable in response to the operation of the focusing ring 35 through the diaphragm driving plate.

At this point, if the value of the film sensitivity is varied to another value by the operation of the guide number ring 22, the movable shaft 28 which has already moved to one position with respect to the shaft 29 of the rocker lever 27 in response to the selected value of the film sensitivity, is swung around the shaft 29 of the rocker lever to the other position by the cam action of the compensation cam 22b. Therefore, even if the position of the second pin 25 with respect to the cam 35a formed on the focusing ring 35 has been placed as mentioned, the position of the end 23a of the diaphragm driving plate is varied by said cam action of the compensation cam 22b with respect to the aperture pin 36. Consequently the aperture of the diaphragm is also set in response to the sensitivity of the film used.

At this time, the meter pointer 51 is already deflected to the position where the aperture blades are full open, so that if the photographing distance is set by turning the focusing ring, the aperture pin 36 is urged by the cam of the focus — aperture control cam 35a corresponding to the amount of turn of said focusing ring to slide the aperture blades 62 so as to provide an aperture which gives correct exposure as to the set photographing distance, the guide number of the flash light device being used and the sensitivity of the film being used. Further, when the intermediate lever 16 is turned counterclockwise, the operating switch 19, 20 is accordingly closed to bring the flash light emission circuit into its operable condition, so that if the shutter release plate 56 is pushed down under this condition, the light tuning contacts (not shown) are closed to accomplish the proper flashlight photography.

In case the guide number of the flash light device is fixed, it is necessary to compensate for variation of the aperture that results from the difference of film sensitivity. Therefore, in the shown embodiment, a guide number ring is provided to solve this problem. This is based on the principle that when the sensitivity of the film used differs from the predetermined one, the operating protuberance 22a is operated to change the position of contact of the compensation cam 22b with the movable shaft 28 so as to change the diaphragm aperture from the aperture for the predetermined sensitivity.

While the invention has been described in detail in connection with specific mechanisms adapted to cooperate with the conventional elements of an exemplary camera, it will be obvious to those skilled in the art that the invention can make use of other known and equivalent mechanisms, and is not limited to the specific embodiment described except as set forth in the claims which follow.

What is claimed is:

1. In a camera having a housing, an objective lens, an adjustable diaphragm, focusing means, and an automatic exposure controlling device, the combination of means selectively controlling said adjustable diaphragm by said focusing means or by said automatic exposure controlling device, an electronic flash, means movably mounting said electronic flash on said housing from a first position relative to the optical axis of said objective lens to a second position located at a sufficiently greater distance relative to the optical axis of said objective lens to prevent the red-eye phenomenon during the electronic flash operation, and means controlled by movement of said electronic flash mounting means to its second position for operating said selectively controlling means to transfer control of said adjustable diaphragm from said automatic exposure controlling device to said focusing means.

2. In a camera according to claim 1, the combination of an on-off switch for use in the power circuit of said electronic flash, and means responsive to movement of said electronic flash mounting means for opening said switch in the first position thereof and closing said switch in the second position thereof.

3. In a camera according to claim 1, in which said means selectively controlling said adjustable diaphragm includes a ring rotatably mounted in said housing coaxially with said objective lens, and lever means pivotally mounted in said housing connected at one end to said rotatably mounted ring and at its other end in the path of movement of said electronic flash mounting means, and a pair of spaced members on said movable electronic flash mounting means positioned to engage the cooperating end of said lever means at the extreme positions of said electronic flash.

* * * * *